May 16, 1933.  J. J. FLANIGAN  1,909,758
DUPLICATING MACHINE
Filed Oct. 2, 1931   3 Sheets-Sheet 1
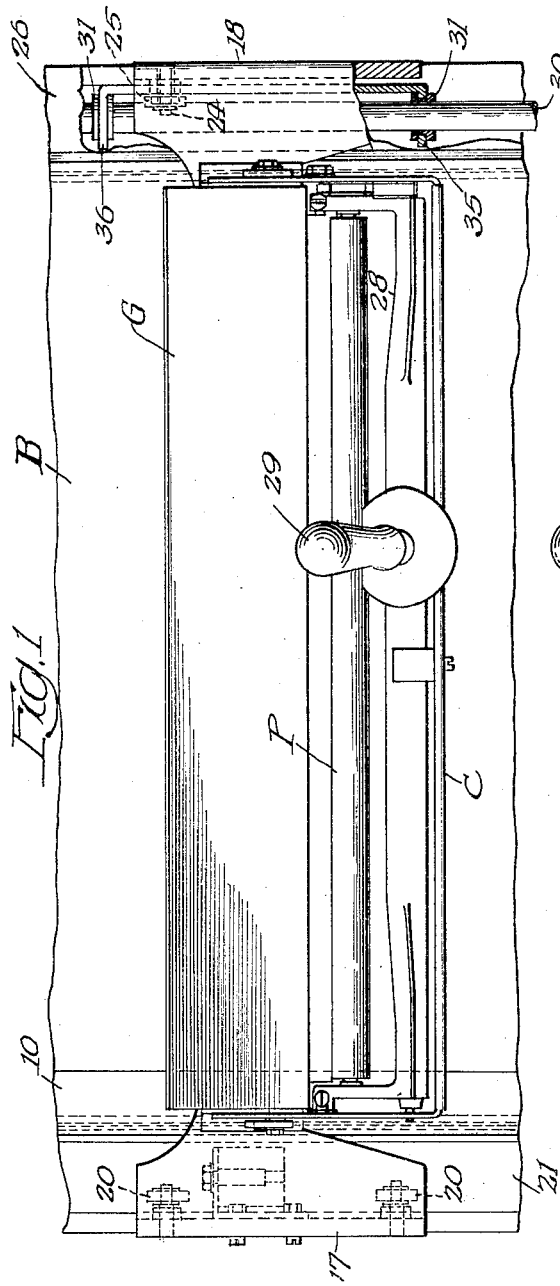
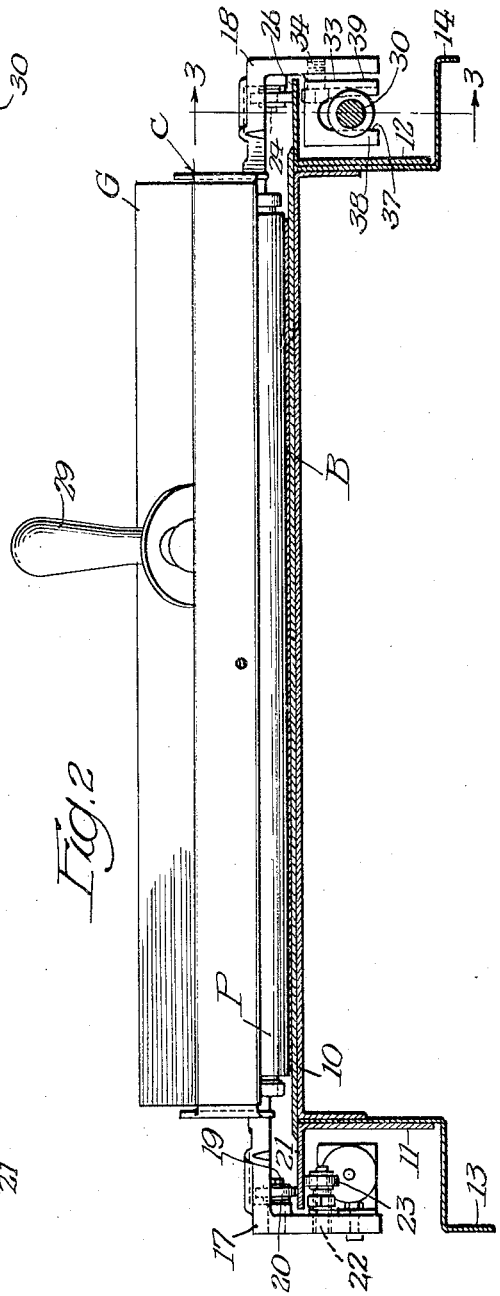

May 16, 1933.   J. J. FLANIGAN   1,909,758
DUPLICATING MACHINE
Filed Oct. 2, 1931    3 Sheets-Sheet 2
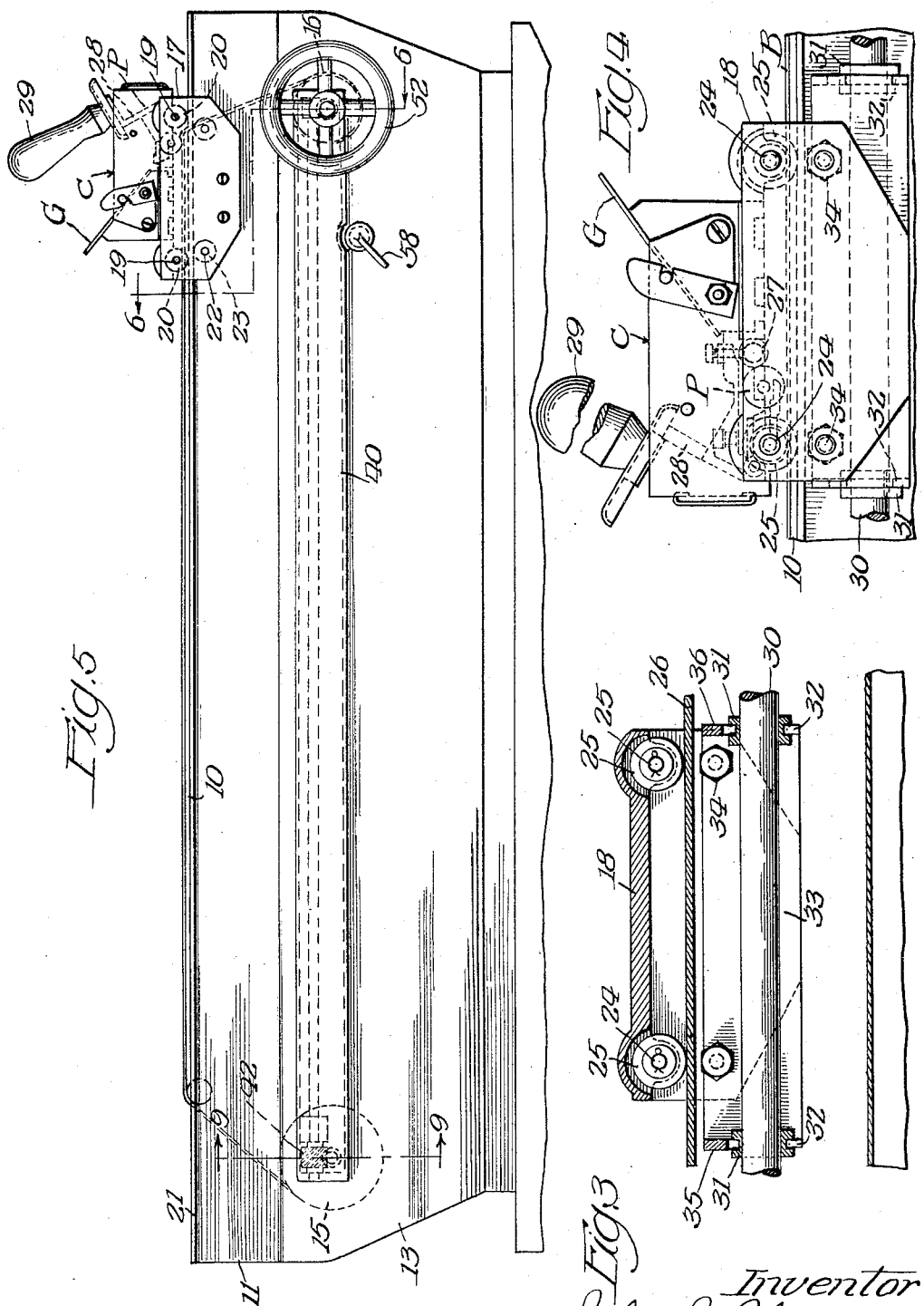
Inventor
John J. Flanigan
By Wm. O. Belt, Atty.

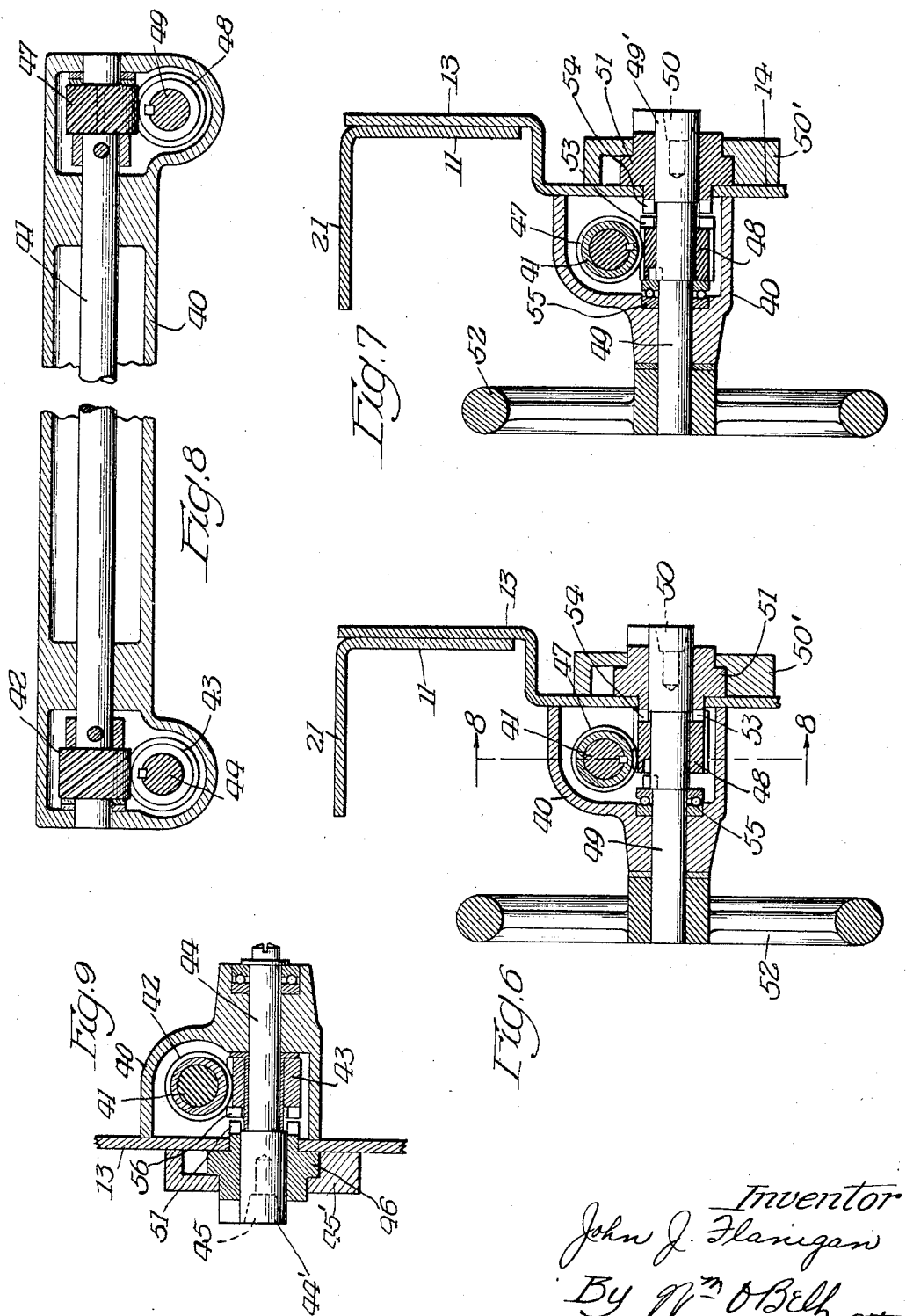

Patented May 16, 1933

1,909,758

UNITED STATES PATENT OFFICE

JOHN J. FLANIGAN, OF OAK PARK, ILLINOIS, ASSIGNOR TO VIVID, INCORPORATED, OF CHICAGO, ILLINOIS, A CORPORATION OF ILLINOIS

DUPLICATING MACHINE

Application filed October 2, 1931. Serial No. 566,449.

This invention relates to duplicating machines operating on the hectograph principle and wherein a gelatin band is stretched across the bed of the machine to be withdrawn from a roll at one end of the machine and wound upon a roll at the other end of the machine whereby a form to be duplicated may be transferred onto the portion of the band stretched across the bed to provide a matrix from which impressions may be made onto sheets applied thereto.

Hectograph duplicating machines usually embody a carriage mounted on rollers traveling on trackways extending parallel with the bed of the machine whereby the carriage may be reciprocable over the portion of the gelatin band stretched across the bed. When a form is to be transferred onto the band to provide a matrix it is customary to use the carriage to apply the original sheet carrying the form to the band and therefore when the sheets to receive the impressions are subsequently applied to the band by the carriage in the same manner as that in which the form was applied, the registration of the form on the impression receiving sheets will correspond to the registration of the form on the original sheet. It is therefore necessary that the carriage repetitiously reciprocate over the portion of the gelatin band providing the matrix in a uniform manner so that proper registration of the impression receiving sheets relative to the matrix will be assured. To assure such uniform reciprocation, it is common to provide a guide rod at the side of the machine and to so connect the carriage to this guide rod that the carriage will be properly guided thereby. A high degree of accuracy is required in the guiding of the carriage and because of this it is necessary that the guide rod be accurately positioned. Moreover, both the guide rod and the trackways are carried by the frame and as the carriage travels on both the trackways and the guide rod it is necessary that the guide rod be positioned accurately relative to the trackways to avoid binding during reciprocation of the carriage. In the past it has been very difficult to prevent this binding where the carriage is so connected to the trackways that it is held against vertical movement with respect thereto and the salient object of my invention is to provide a duplicating machine wherein trackways for supporting the carriage and a guide rod will be provided and to so mount the carriage for movement on the trackways and to so connect the carriage to the guide rod that binding of the carriage during reciprocation thereof will be prevented.

Another object of my invention is to provide spaced devices on the guide rod to which the carriage may be connected and to sufficiently space these devices that positive guiding of the carriage will result and to so connect the carriage and guiding devices that relative movement therebetween will be afforded whereby binding of the carriage will be prevented without impairing the accurate guiding of the carriage.

A further object of the invention is to provide a novel hectograph duplicating machine wherein the gelatin band will be stretched across the bed from the supply and take-up rolls positioned at opposite ends of said bed and wherein the gelatin band may be wound from either of these rolls onto the other by an operating device associated with one of the rolls which will automatically operate to connect one of said rolls thereto as the operating device is moved in one direction and which will automatically connect the other roll thereto as the operating device is moved in the opposite direction.

A still further object of the invention is to provide a novel hectograph duplicating machine of simple and economical construction and efficient and positive operation.

In the selected embodiment of the invention illustrated in the accompanying drawings Fig. 1 is a fragmentary plan view of a duplicating machine embodying my invention;

Fig. 2 is a transverse sectional view of the machine as shown in Fig. 1;

Fig. 3 is a view taken substantially on the line 3—3 of Fig. 2;

Fig. 4 is an end view looking in at the right hand end of Fig. 2;

Fig. 5 is an elevation of the left hand side of my improved duplicating machine as illustrated in Fig. 1;

Fig. 6 is a sectional detail view taken substantially on the line 6—6 of Fig. 5 showing a portion of the operating mechanism in one position;

Fig. 7 is a view similar to Fig. 6 showing the operating mechanism in another position;

Fig. 8 is a sectional detail view taken substantially on the line 8—8 of Fig. 6; and Fig. 9 is a sectional detail view taken substantially on the line 9—9 of Fig. 5.

Referring to the drawings wherein I have illustrated a selected embodiment of my invention, 10 indicates the bed of a hectograph duplicating machine supported between side members 11 and 12 mounted at the upper end of the side wall members 13 and 14 of a suitable frame or the like. A gelatin band B is directed across the bed 10 from a supply roll 15, at the rear end of the bed, to a take-up roll 16, at the front end of the bed, and suitable means to be described hereinafter are provided for winding the band from either of these rolls onto the other. A carriage C is provided which includes side frame members 17 and 18. In the side frame member 17 are studs 19 on which wheels 20 are rotatably mounted and these wheels travel along the upper surface of the horizontal flange 21 of the side member 11. Studs 22 are also mounted in the side frame member 17 and carry wheels 23 which travel on the underside of the horizontal flange 21. As best illustrated in Fig. 1 the wheels 20 are provided adjacent the ends of the side frame member 17 and the wheels 23 are mounted in substantially vertical alignment with the wheels 20. In the side frame member 18 adjacent the ends thereof are studs 24 (Fig. 3) on which wheels 25 are rotatably mounted, which wheels are adapted to travel on the upper side of the horizontal flange 26 of the side member 12. Thus the carriage is supported by the wheels thereon for movement over the horizontal flanges which provides trackways and support the carriage during movement thereof over the portion of the gelatin band disposed on the bed 10. The carriage C includes a paper guide G over which a sheet may be passed to be inserted between the clamping roller 27 and the platen roller P both of which are mounted in the carriage C. The platen roller P is mounted in a rockable frame 28 on which there is a handle 29. By grasping the handle 29 the platen roller may be moved into a position above and away from the clamping roller 27 to permit a sheet to be passed between these rollers. After the sheet has been passed between the rollers the platen roller P is caused to move past the center of the clamping roller 27 into a lowered position wherein it is forced toward the band and the sheet is tightly held against the band as well as being securely clamped between the platen roller and the clamping roller. Since the platen roller is, in effect, clamped against the band it will be rotated as the carriage moves over the portion of the band above the bed 10 whereby the sheet will be applied to the gelatin band. By applying an original form on the band a matrix may be provided from which impressions may be taken onto sheets applied to the matrix. The sheet bearing the original form and the impression receiving sheets are laid upon the gelatin band by the platen roller P in the manner above described and since both the original form and the impression receiving sheets are applied to the band B by the platen roller, it is manifest that proper registration of the impression on the impression receiving sheets will result provided the carriage repetitiously operates in a uniform manner upon successive operations. To assure such operation it is necessary that the carriage be held against transverse movement with respect to the band other than the reciprocatory movement thereover. To accomplish this a guide rod 30 is mounted below the horizontal flange 26, and is, therefore, below the plane of the bed 10, and this guide rod is suitably supported from the side member 12. Collars 31 are mounted on the guide rod 30 and have peripheral grooves 32 therein. A strip 33 is secured in the side frame member 18 below the horizontal flange 26 by bolts 34 or the like and has the main extent thereof extended substantially parallel with the side frame member. The ends of the strip 33 extend at right angles to the main extent thereof and such right angularly extending end portions are indicated by 35 and 36 and are extended toward the center of the machine. In the end portions 35 and 36 are substantially U-shaped bifurcations 37 providing limbs 38 and 39. The limbs 38 and 39 are extended into the grooves 32 in the collars 31 and thus a collar 31 is provided adjacent each end of the side frame member 18. The collars 31 are slidable on the rod 30 and inasmuch as these collars are spaced apart an effective guide is provided which prevents transverse movement of the carriage with respect to the gelatin band other than the reciprocatory movement thereof and in this manner uniform reciprocation of the carriage upon successive operations thereof is insured to thereby insure proper registration of the form on the sheets. It should be noted that rollers are provided on both sides of the flange or trackway 21 while rollers are provided on but one side of the flange or trackway 26 and that the guide rod is mounted below this trackway 26. It is apparent that if the guide rod 30 were not parallel with the trackway 26 and the carriage is fixedly connected to the guide rod that binding of the carriage during its reciprocation would result, this occurring either where the guide rod is spaced from the trackway in an amount greater than that for which the connection is arranged or in an amount less than that for which a connection is arranged. However, by providing the collars on the guide rod and by arranging the limb portions in the peripheral grooves in the collars, an interconnection between the guide rod and the carriage is provided which affords relative movement. It should be noted that this relative movement might be attained in other ways than by arranging limb portions in bifurcated collars as, for example, by connecting the strip 33 to the member 18 for relative movement. The connection is so arranged that the collars 31 are arranged medially in the bifurcations in the end portions 35 and 36 whereby either upward or downward relative movement may be had. Consequently the guide rod need not be arranged to be absolutely parallel with the trackway 36 and since relative movement between the guide rod and carriage is permissible, it is manifest that the rollers 25 will always ride on the trackway 26. And since the rollers 20 and 23 are arranged on opposite sides of the trackway 21, it is manifest that the carriage is held against vertical movement at this end. In the foregoing manner the carriage is very effectively guided to insure uniform repetitious reciprocation thereof but at the same time binding of the carriage due to improper orientation of the parts is prevented by reason of the relative movement which may compensate for improper orientation.

It has been pointed out that the gelatin band is withdrawn from a supply roll and directed over the bed of the machine to a take-up roll. Suitable mechanisms are provided for winding the gelatin band from the supply roll to the take-up roll or in the opposite direction and such means are illustrated in Figs. 5 to 9 inclusive. These means include a housing 40 secured to the outer face of the frame member 13. A shaft 41 is journaled in the housing and has spiral gears 42 and 47 fast thereon adjacent the ends thereof. The spiral gear 42 meshes with the spiral gear 43 keyed to the shaft 44 to be slidable thereon and rotatable therewith. A shaft 44', axially aligned with the shaft 44, has a socket 45 at the inner end thereof and carried by the shaft 44' is a clutch member 46, journaled in the housing 45'. One end of the spindle of the supply roll is mounted in the socket 45 and a clutch member on this spindle engages the clutch member 46. One spindle which may be so used is shown in the McNally reissue Patent No. 18,448, reissued May 3, 1932.

The other end of the spindle is suitably journaled in a bearing in the side wall member 14. The spiral gear 47 meshes with the spiral gear 48 keyed to and slidable on the shaft 49. A shaft 49' axially aligned with the shaft 49, has a socket 50 therein in which one end of the spindle for the take-up roll may be mounted, the other end of said spindle being journaled in a bearing in the side member 14 and this spindle may likewise be one of the kind shown in the McNally patent. Mounted on the shaft 49' is a clutch member 51 which, like the clutch member 46, is adapted to cooperate with a clutch member on the spindle, this clutch member being journaled in the housing 50'. The shaft 49 extends outwardly of the housing 40 and has a hand wheel 52 fast thereon. When the hand wheel 52 is turned in one direction the interengagement between the spiral gears 48 and 47 causes the spiral gear 48 to slide along the shaft 50 whereby the clutch teeth 53 thereon engage the clutch teeth 54 on the clutch member 51 to thereby interconnect the spiral gear 48 and the clutch member 41, as shown in Fig. 6, so that as the hand wheel 52 is rotated the clutch member 51 and consequently the spindle of the take-up roll 16 will be rotated to thereby wind the band across the bed 10 from the supply roll 15. When the hand wheel 52 is turned in the opposite direction the interengagement between the spiral gears 48 and 47 will cause the spiral gear 48 to so move that the teeth 53 will disengage the teeth 54 and the end of the spiral gear 48 will engage the thrust bearing 55 disposed about the shaft 49 and engaged with the housing 40. This position of the spiral gear 48 is shown in Fig. 7. Regardless of which direction the hand wheel 52 is rotated, the interengagement between the spiral gears 48 and 47 will always rotate the shaft 41. However, when the spiral gear is rotated in the direction which causes the interengagement of the clutch teeth 53 and 54, the interconnection between spiral gears 42 and 43 causes the spiral gear 43 to shift on the shaft 44 into the position shown in Fig. 9. When the hand wheel 52 is rotated to cause the spiral gear 48 to engage the thrust bearing 55 the interengagement between the spiral gears 42 and 43 causes the spiral gear 43 to so slide on the shaft 44 that the clutch teeth 56 thereon engage the clutch teeth 57 on the clutch member 46. Therefore the spindle of the supply roll will be rotated and the gelatin band will be unwound from the take-up roll and wound upon the supply roll. Since the band may be easily wound in either direction, it may be properly oriented on the bed 10 to locate the matrix thereon in the desired position, this opposite winding being particularly advantageous to vary the margin on the sheets and to compensate for line spacing so that impressions may be made on lines on the impression receiving sheets when so desired. Inasmuch as the gelatin band must be drawn tightly across the bed 10 to insure that clear cut impressions be made therefrom, a brake device, operated by the handle 58, may be provided and one such brake device suitable for use in this machine is disclosed in my copending application Serial No. 562,245, filed September 11, 1931.

From the foregoing description it is manifest that I have provided a duplicating machine wherein the carriage will uniformly reciprocate over the bed of the machine to insure proper applying of the sheets to the matrix so that properly oriented impressions may be transferred from the matrix onto the sheets. Furthermore binding of the carriage during reciprocation thereof will be prevented. Moreover, I have provided a machine wherein the gelatin band may be wound or unwound from either of the rolls provided at opposite ends of the bed which facilitates proper positioning of the matrix.

In the foregoing description I have set forth a selected embodiment of my invention but it is to be understood that this is capable of variation and modification and I therefore do not wish to be limited to the precise details set forth but desire to avail myself of such changes and alterations as fall within the purview of the following claims:

I claim:

1. In a duplicating machine, a bed, a frame supporting said bed, a guiding device on said frame, a carriage movable over said bed, an elongated guide member on said carriage and means connecting said guide member to said guiding device at spaced places and affording relative movement between the carriage and the guiding device as said carriage is moved over said bed, said guide member cooperating with said guiding device to insure uniform movement of said carriage during repetitious movements thereof over said bed.

2. In a duplicating machine, a bed, a frame supporting said bed, a carriage movable over said bed, a guide rod for said carriage and carried by said frame, an elongated guide member on said carriage, and means embodying portions slidable on said guide rod and connecting the guide member to the guide rod at spaced places and affording relative movement between the carriage and the guide rod, said portion slidable on the guide rod and said elongated member cooperating to insure uniform movement of the carriage during repetitious movements thereof over said bed.

3. In a duplicating machine, a bed, a frame supporting said bed, a carriage movable over said bed, guiding means on the frame, guiding devices connected to the carriage and cooperating with the guiding means to guide the carriage during movement thereof, and means connecting said guiding means and guiding devices and affording relative movement therebetween.

4. In a duplicating machine, a bed, a frame supporting said bed, a carriage movable over said bed, a guide rod for said carriage, spaced collars slidable on said guide rod, and means slidably connecting said carriage to said collars to afford relative movement between the carriage and the collars in a vertical plane as said collars slide along said guide rod and prevent pivotal movement of said carriage in a horizontal plane.

5. In a duplicating machine, a bed, a frame supporting said bed, a carriage movable over said bed, a guide rod for said carriage mounted below the plane of said bed, spaced collars slidable on said guide rod, and means connecting said carriage to said spaced collars to uniformly guide said carriage during repetitious movements of said carriage over said bed, said connecting means affording relative movement between said carriage and said collars to compensate for unevenness in the surface of said bed.

6. In a duplicating machine, a bed, a frame supporting said bed and providing trackways extending parallel with the bed, a carriage movable along said trackways and over said bed, a guide rod for said carriage, spaced collars slidable on said guide rod, connecting means on said carriage and including spaced parts slidably connected to the collars to afford relative movement between the carriage and said collars, said collars moving on said guide rod to insure proper movement of said carriage upon repetitious movements thereof over said bed.

7. In a duplicating machine, a bed, a frame supporting said bed and providing trackways extending parallel with the bed, a carriage movable along said trackways and over said bed, a guide rod for said carriage, collars slidable on said guide rod and having grooves in the periphery thereof, connecting means on said carriage and having portions thereon disposed in the grooves in said collars to be slidable therein whereby said carriage may move relative to said collars as said collars move along said guide rod to insure proper movement of said carriage over said bed upon repetitious operations thereof.

8. In a duplicating machine, a bed, a frame supporting said bed, trackways on said frame and extending parallel with said bed, a carriage, wheels at one end of said carriage engaging both sides of one of said trackways, wheels at the other end of said carriage and riding on the upper side of the other of said trackways, a guide rod disposed below said other of said trackways and co-extensive therewith, and means connecting the carriage to the guide rod and permitting movement of the carriage relative to the guide rod whereby binding of said carriage during reciprocation thereof over said bed will be prevented.

9. In a duplicating machine, a bed, a frame supporting said bed, trackways on said frame and extending parallel with said bed, a carriage, wheels at one end of said carriage engaging both sides of one of said trackways, wheels at the other end of said carriage and riding on the upper side of the other of said trackways, a guide rod disposed below said other of said trackways and coextensive therewith, collars slidable on said guide rod, and means connecting said carriage to said collars and affording relative movement between said carriage and said collars to prevent binding of said carriage during reciprocation thereof over said bed.

10. In a duplicating machine, a bed, a frame supporting said bed, trackways on said frame and extending parallel with said bed, a carriage, wheels at one end of said carriage engaging both sides of one of said trackways, wheels at the other end of said carriage and riding on the upper side of the other of said trackways, a guide rod disposed below said other of said trackways and coextensive therewith, spaced collars on said guide rod and having grooves in the peripheries thereof, a plate mounted on the side member of the carriage which carries the wheels riding on said other of said trackways, said plate having bifurcated portions thereon embracing said collars and affording relative movement between said carriage and said collars to prevent binding of said carriage during reciprocation thereof over said bed.

JOHN J. FLANIGAN.